UNITED STATES PATENT OFFICE.

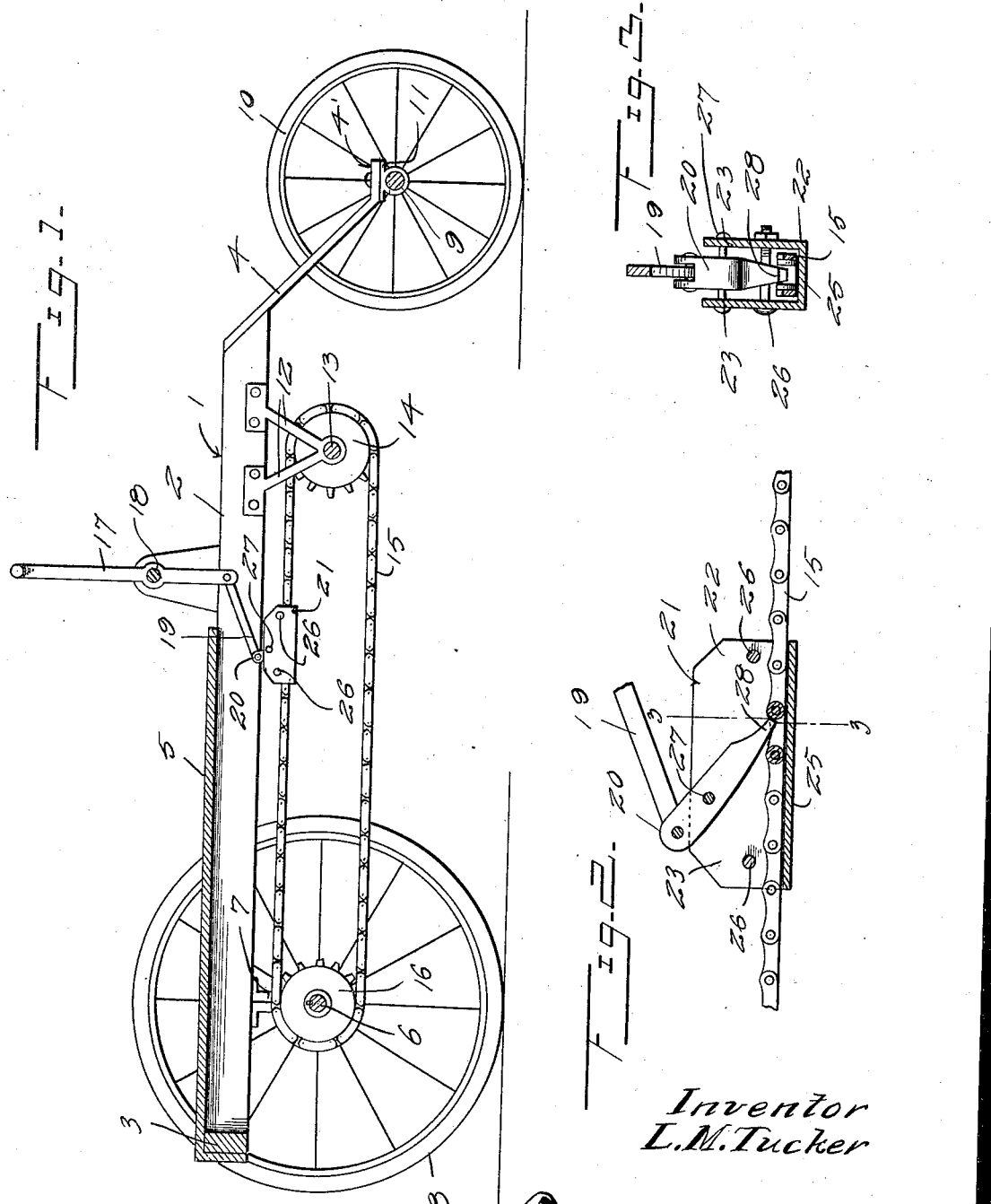

LEONARD M. TUCKER, OF SEATTLE, WASHINGTON.

MANUALLY-PROPELLED VEHICLE.

1,346,727.   Specification of Letters Patent.   Patented July 13, 1920.

Application filed July 23, 1919. Serial No. 312,701.

*To all whom it may concern:*

Be it known that I, LEONARD M. TUCKER, a citizen of the United States, residing at Seattle, in the county of King and State of Washington, have invented certain new and useful Improvements in Manually-Propelled Vehicles; and I do hereby declare the following to be a full, clear, and exact description of the invention, such as will enable others skilled in the art to which it appertains to make and use the same.

This invention relates to manually propelled vehicles and is an improvement over my Patent No. 1,273,693, issued July 23, 1918.

The primary object of the invention is to improve the construction of the chain grip so that the dog for engaging the chain will be positively brought into and out of engagement with the chain thereby facilitating the operation of the vehicle.

A further object of the invention is to provide means for operatively connecting the chain engaging dog with the operating lever for bringing the same into and out of engagement with the clutch chain.

A still further object of the invention is to provide an improved device of the above character, which is durable and efficient in use, one that is simple and easy to manufacture, and one that can be placed upon the market at a reasonable cost.

With these and other objects in view, the invention consists in the novel construction, arrangement and formation of parts as will be hereinafter more specifically described, claimed and illustrated in the accompanying drawings, forming a part thereof, in which:

Figure 1 is a longitudinal sectional view through the vehicle,

Fig. 2 is an enlarged sectional view through the chain grip, and

Fig. 3 is a transverse section taken on the line 3—3 of Fig. 2.

Referring to the drawings in detail, wherein similar reference characters designate corresponding parts throughout the several views, the numeral 1 generally indicates the improved vehicle, which includes a pair of spaced parallel side members 2, which are secured in spaced relation by the transverse connecting members 3 and connected at the forward terminals by the inclined arms 4.

A seat comprising a flat plate or board 5 is secured upon the rear portion of the side members 2. The rear driving axle 6 is journaled in bearings 7 secured beneath the rear portions of the members 5 adjacent to the rear end thereof. The axle 6 carries the propelling wheels 8 and the front axle 9 carries the steering wheel 10, the front axle 9 being pivotally connected as at 11 with the inclined arms 4 whereby the vehicle may be conveniently steered during travel.

Depending bearing arms 12 are secured to the side members 2 and rotatably support a shaft 13 on which is journaled a sprocket wheel 14. The forward portion of sprocket chain 15 travels upon the wheel 14 and the rear portion thereof travels upon the drive sprocket wheel 16, which is non-rotatably secured upon the rear axle 6, whereby the movement of the chain is transmitted to the rear wheel 8 to propel the vehicle. A hand lever 17 is pivotally mounted as at 18 between the side members 2 and is connected at its lower terminal to a link 19 which in turn is pivotally connected to the rear end of the operating dog 20, which constitutes a part of the chain grip 21, which will be hereinafter more fully described.

The chain grip 21 consists of a housing 22 substantially U-shaped in cross section providing the side plates 23 and the bottom 25 in which the chain 15 is slidably mounted. The side plates also carry cross bolts 26 which prevent upward movement of the chain. The dog 20 is pivoted intermediate its ends on a pivot pin 27, which is carried by the side walls 23 of the housing and the link 19 is pivoted to the dog in rear of the pivot pin. The upper and side faces of the dog at the forward end thereof are beveled as at 28, so as to provide a relatively sharp point for engaging the link of the chain.

In operation of the improved device, the lever is forced forwardly, which raises the dog out of engagement with the chain 15 and permits the chain grip to slide rearwardly on the chain without operating the same. The lever is then drawn rearwardly, which throws the lower end of the dog in engagement with the link and draws the chain grip forwardly, thus carrying the upper run of the chain therewith, which in turn operates the axle 6 and the wheels 8.

From the foregoing description, it can be seen that an efficient means is provided for engaging the operating chain so as to positively form means for engaging and releasing the same for propelling the vehicle.

In practice, I have found that the form of my invention illustrated in the accompanying drawings and referred to in the above description, as the preferred embodiment, is the most efficient and practical; yet realizing the conditions concurrent with the adoption of my device will necessarily vary, I desire to emphasize that various minor changes in details of construction, proportion and arrangement of parts may be resorted to, when required without sacrificing any of the advantages of my invention as set forth.

What I claim as new is:

1. A manually propelled vehicle including front and rear wheels, a frame structure supported upon said wheels, a chain operatively connected with the rear wheel for propelling the latter, a pivoted hand lever, a housing carried by and embracing said chain, a dog pivotally secured intermediate its ends to said housing and adapted to coact with the chain during movement of the housing in one direction to propel the vehicle, and a link pivotally secured to the lower end of the lever and to the rear end of the dog in rear of said pivot means for the dog, as and for the purpose specified.

2. A manually propelled vehicle including front and rear wheels, a frame structure supported upon said wheels, a chain operatively connected with the rear wheel for propelling the latter, a hand lever pivotally secured intermediate its ends to said frame, a substantially U-shaped housing carried by and embracing said chain, a link pivotally secured to the lower end of said lever, a dog pivotally secured intermediate its ends to said housing, and means pivotally connecting the lower end of the link to the rear end of said dog, the lower free end of said dog having its front and side faces beveled, as and for the purpose specified.

3. A manually propelled vehicle comprising a frame and propelling means including a driving chain, an actuating lever pivotally mounted, a housing slidably associated with the chain for movement longitudinally thereof, a dog pivotally mounted intermediate its end to said housing and adapted to engage the chain during movement of the housing in one direction to impart movement to the chain, and a link pivotally connected with the lower end of the lever and to the upper end of the dog whereby the dog may be moved out of engagement with the chain when the housing is moving in one direction and brought into engagement with the chain when the housing is moved in the opposite direction.

In testimony whereof I affix my signature in presence of two witnesses.

LEONARD M. TUCKER.

Witnesses:
W. R. MAXWELL,
E. S. FULLER.